Jan. 12, 1954     F. S. LOW ET AL     2,666,024
OXIDATION AND CHLORINE RECOVERY PROCESS
Filed April 22, 1949
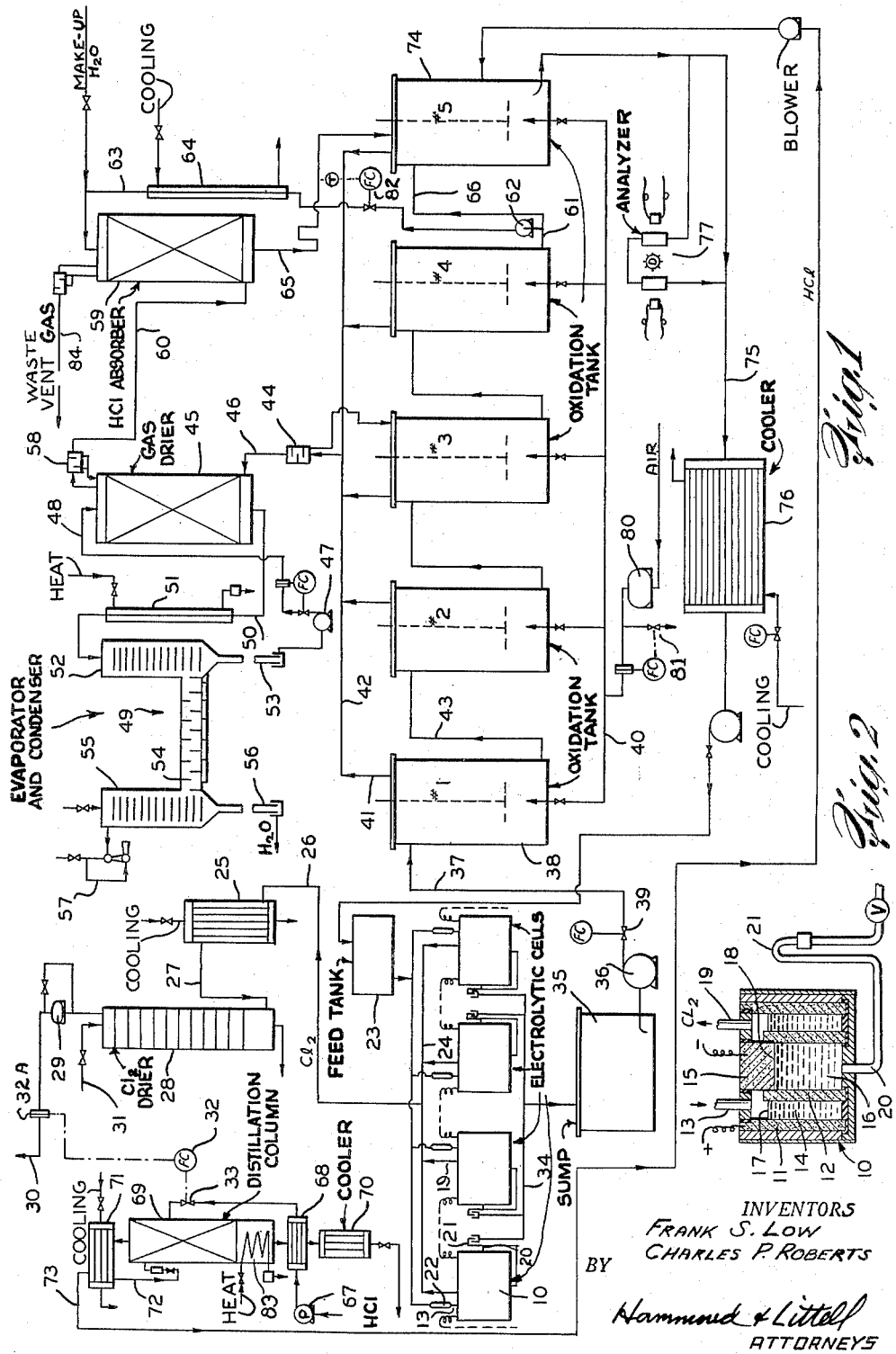
INVENTORS
FRANK S. LOW
CHARLES P. ROBERTS
BY Hammond & Littell
ATTORNEYS Patented Jan. 12, 1954

2,666,024

UNITED STATES PATENT OFFICE 2,666,024

OXIDATION AND CHLORINE RECOVERY PROCESS

Frank S. Low, Rowayton, Conn., and Charles P. Roberts, South Charleston, W. Va., assignors to Food Machinery and Chemical Corporation, New York, N. Y., a corporation of Delaware Application April 22, 1949, Serial No. 88,954

2 Claims. (Cl. 204—128)

This invention relates to a process and apparatus involving a solution containing hydrochloric acid and polyvalent metal chloride to be alternately oxidized from a lower state of valence to a higher state of valence, and reduced from a higher state of valence to a lower state of valence with liberation of chlorine, said process being adapted to be used, for example, in a system and process for recovering chlorine from hydrogen chloride.

In the oxidation of a polyvalent metal chloride from a lower state of valence to a higher state of valence in a hydrochloric acid solution, by blowing air or oxygen therethrough, water is formed in the reaction and considerable HCl will be carried out with the spent oxidizing gases. It is necessary to remove the formed water from the solution and also to return to the solution or liquor stream, the HCl carried over with the spent gases from the oxidation step.

Such an oxidation process is useful for various purposes and one of these is that in which there is a problem of recovering chlorine from waste hydrochloric acid such as described in the patents to Frank S. Low, Nos. 2,468,766 and 2,470,073, issued on May 3, 1949, and May 10, 1949, respectively. The recovery of chlorine from waste hydrochloric acid always has been a problem, particularly because of the large number of industrial processes wherein hydrochloric acid is an unavoidable product. Direct electrolysis of hydrochloric acid and recovery by the Deacon process have not been satisfactory or economically feasible for the purpose. In the process described in said copending patents, polyvalent metal chloride, such as cupric chloride, ferric chloride, and other suitable polyvalent metal chlorides are electrolyzed in a cell such as of the type described therein, the aqueous solution to be electrolyzed containing HCl and polyvalent metal chloride in an oxidized state. A portion of the polyvalent metal chloride is reduced in the cell so as to liberate chlorine which can be recovered in conventional manners. The concentrations of the solution or liquor involved should be kept within certain limits as they tend to be critical in character. The solution containing the reduced metal chloride is then passed into an oxidation apparatus or zone wherein the following reaction takes place:

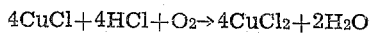

It is seen that in such an oxidation process, water is formed and this water must be removed from the system so as to preserve the proper balance and concentrations, particularly to obtain optimum results, this being of special importance in the commercial operation of the process. Also HCl is carried over with the gases employed in the oxidation and the water removal step, thus requiring measures to recover this HCl.

A portion of the polyvalent metal chloride solution is reduced in an electrolytic cell. The formed gaseous chlorine is removed from the cell as is also the reduced electrolyte.

One of the objects is to provide an improved economical process for recovering of chlorine values from hydrogen chloride by an electrolytic reduction and a subsequent oxidation process.

Another of the objects of this invention is to provide an improved manner of operating a polyvalent metal chloride-hydrochloric acid solution oxidation process, so as to remove the water formed during the oxidation step and recover the HCl carried over by the spent gases.

The invention will be described in conjunction with an electrolytic process for the recovery of chlorine. In general, the polyvalent metal chloride in a higher state of valence in the aqueous hydrochloric acid solution is fed into an electrolytic cell or bank of cells, said cells being constructed, for example, in accordance with the disclosures in said aforementioned patents. In such cells, a porous cathode uniformly spaced from the anode is employed, chlorine being withdrawn from said electrolytic cells as it is formed. The solution containing reduced polyvalent metal chloride is introduced into and carried through an oxidation process, the arrangement of which forms part of the subject matter of this invention. The oxidation apparatus is arranged so that air is pumped therethrough to reoxidize the polyvalent metal chloride to its higher state of valence and to remove the formed water.

In a preferred aspect of the invention, a series of tanks is employed having agitating means therein. In this oxidation process, water is formed and must be removed so as to maintain the correct concentrations when the liquor or electrolyte is returned to the electrolytic cells. The gases passing through the oxidation tanks also are used to remove the water formed during the reaction but these gases also will remove sufficient quantities of HCl to require for optimum economy in operation that provision be made to return the HCl to the system. One manner of accomplishing the return of the HCl is to remove the water from the oxidation step vent gases and then contact the dried vent gases containing the HCl with at least a portion of the solution being passed through the agitated oxidizing tanks so as to reabsorb the HCl in said solution.

In a preferred form, a portion of the solution containing the polyvalent metal chloride therein to be reoxidized is diverted from the liquor stream before it reaches the last oxidizing zone or tank, cooled, and brought into contact with the vent gas from the various oxidation tanks after the water has been removed from said gas, thereby absorbing the HCl and returning it to the main liquor stream.

Another object of the invention is to provide an improved manner of operating the oxidation tank vent gas drier arrangement so that it will be substantially adiabatic.

This aspect can be accomplished by utilizing the heat generated in the exothermic reaction in a drier zone or apparatus employing $H_2SO_4$. By connecting the drier arrangement with an evaporating and a condensing device and properly insulating this part of the system, a substantially adiabatic process can be obtained. The heat generated in the vent gas drier will be available for evaporation in an evaporator arrangement for separating the sulphuric acid from the water removed from the vent gases. The water then can be condensed for disposal. A barometric condenser and evaporator can be used for the aforementioned purpose of evaporating and condensing.

When the oxidation system is used in conjunction with an electrolytic cell arrangement for recovery of chlorine, automatic controls can be utilized wherein the outflow rate or volume of chlorine is employed to govern the inflow of hydrochloric acid in the correct proportions to maintain the desired and optimum concentration of HCl in the system at all times, such a control and maintenance of concentration in conjunction with efficient water removal insuring a satisfactory and economical operation. It is to be understood that other methods of control can be used.

These and other advantages, objects, and features of the invention will become apparent from the following description and drawings.

Figure 1 illustrates a complete system for the recovery of chlorine from hydrochloric acid.

Figure 2 is a sectional view of one form of electrolytic cell which can be used in the system of Figure 1.

Describing generally the system of Figure 1, the aqueous solution containing polyvalent metal chloride in its higher state of valence together with hydrochloric acid is fed into an electrolytic cell arrangement. The hydrochloric acid in the solution serves to increase the solubility of the metal chloride in the solution and also as a source of chlorine in the process to be described hereafter. In the electrolytic cell arrangement, the polyvalent metal chloride is reduced from a higher state of valence to a lower state of valence and the chlorine is formed therein and removed from the cells. The electrolyte containing reduced polyvalent metal chloride is gathered and passed through the series of oxidation tanks or zones for the purpose of reoxidizing the polyvalent metal chloride so that the process can be continuous.

A plurality of oxidation tanks or zones having agitators are connected in series, air or oxygen being blown through each of said tanks under agitated conditions, for oxidizing the polyvalent metal chloride, a portion of the oxidation being carried out in each of the tanks in sequence.

The vent gases from the various oxidation tanks are collected, said vent gases containing the water formed in the process together with the HCl carried over from the oxidation zones. The oxidation tank vent gases are then subjected to a drying process for the purpose of removing the contained water. The dried gases are thereafter contacted with at least a portion of the liquor stream containing the polyvalent metal chloride so as to reabsorb the HCl into said stream.

In a preferred form, a portion of the liquor stream utilized for reabsorbing the HCl from the spent oxidation gases is diverted from the system before the last oxidation tank is reached and then the diverted portion with the reabsorbed HCl is returned to the system in the last oxidation tank, together with hydrochloric acid equivalent to the amount of chlorine used in the preceding electrolytic step. In such an arrangement, it is possible to use the outflow of chlorine to control the inflow of HCl into the system so as to maintain the proper concentrations of HCl, water, and polyvalent metal chloride.

One type of suitable electrolytic cell arrangement will be described, reference being made to said aforementioned patents. The electrolytic cell illustrated at 10 (Figs. 1, 2) may have an anode 11 of substantially impervious graphite. The cathode 12 is formed of a porous graphite or any good grade of porous conducting carbon. Merely by way of example, a satisfactory porous material is one having a permeability of about 30 gallons of water per square foot per minute at 5 lbs. per square inch pressure; although cathodes having as high a permeability as 175 gallons per square foot per minute at 5 lbs. per square inch pressure and as low as 0.3 gallon per square foot per minute at 5 lbs. per square inch pressure may be used provided the system is properly arranged. The above permeabilities are based on the flow of water at 70° F. through graphite which is 1″ thick.

The use of a porous graphite cathode eliminates the necessity of a diaphragm, and this omission removes one of the principal difficulties which is ordinarily encountered in the electrolyzing of hydrochloric acid solutions directly. There are only a few materials which are satisfactory for use as diaphragm media in a solution containing substantial quantities of hydrochloric acid. Even acid leached asbestos tends to disintegrate slowly in such a solution and glass wool tends to dissolve slowly in the solution. By eliminating the diaphragm, the cell construction is greatly simplified, and the voltage requirements of the cell are reduced.

The electrodes 11 and 12 may be concentric or may be flat as desired, it being desirable that the active surfaces of the cathode and anode should be spaced apart substantially the same distance over their entire active area so as to obtain the most efficient results in the electrolytic cell. A uniform electrolytic gap of between about ½″ to 1″ is desirable.

The electrolyte is introduced through pipe 13 (Figs. 1, 2) into the anolyte chamber 14 (Fig. 2) between anode 11 and cathode 12. Plug or cover 15 can be shaped so as to form a cover for the catholyte chamber 16, it being noted that the level 17 of the anolyte 14 in the anolyte chamber should be made slightly higher than the level 18 of the catholyte, the catholyte chamber normally being operated so that it is substantially completely full. The formed chlorine is removed through pipe 19 (Figs. 1, 2) from the anolyte chamber 14. Catholyte is removed through pipe 20 and gooseneck 21, said gooseneck serving to maintain the correct level in the catholyte chamber and thereby producing the desired flow characteristics through the porous cathode, it being apparent that other types of level control can be used. In the construction illustrated, there will be no seepage of chlorine through the porous cathode. The electrolyte flow to the cells can be controlled if desired, as by the insertion of tubing sections 22 of appropriate bore, in the supply line from constant head tank 23. The upper portion of the electrodes may be impregnated with a substance such as a mixture of chlorinated naphthalenes to prevent chlorine seepage. The electrodes may be sealed to the base plate of the container by high melting pitch or other suitable material.

The electrolyte composition may have up to about 25% HCl by weight concentration but should not be less than about 5%. There will tend to be an excessive carry over in the formed chlorine when the HCl concentration is above 25% and the resistance of the electrolyte will rise rapidly when below 5% so as to cause excessive power consumption in the cell.

The polyvalent metal chloride, for example, can be copper chloride, iron chloride, or chromium chloride, these being oxidizable from a lower state of valence to a higher state of valence. The polyvalent metal chloride also must be reducible in the electrolytic cell from a higher state of valence to a lower state of valence.

It is preferable to keep the concentration of the polyvalent metal salt in the electrolyte above 5%, the upper limit for the concentration being the solubility of the polyvalent metal chloride in the electrolyte. In the case of cupric chloride at room temperature in a solution containing 20% HCl, the upper limit is about 17% by weight of cupric chloride and is not less than about 18% for ferric chloride. At higher temperatures, the solubility of the chloride becomes higher. It is possible to use lower concentrations but generally when below 5% by weight of cupric or ferric chloride is used, an excessive amount of liquor or electrolyte must be circulated. The optimum concentration of cupric chloride in the electrolyte is about 15% and of ferric chloride about 18%. An electrolyte of approximately 15% by weight of cupric chloride and 20% by weight of hydrogen chloride has high chlorine producing capacity, this concentration also having low corrosiveness with respect to the graphite of the electrolytic cells and high electrical conductivity. In respect to graphite corrosion, it is desirable, although variations may be made, that the concentration of HCl should not be below about 10% for a 5% cupric chloride concentration in order to avoid excessive wear of the electrodes during electrolysis.

The high acidity keeps the metallic chloride in solution and eliminates cathode plugging difficulties or deposition of salts in the circulating lines. If the acid concentration in the electrolyte is not maintained sufficiently high to prevent the precipitation of insoluble compounds at the cathode, the voltage of the cell will slowly rise and the power consumption of the cell will become excessive. Accordingly, it is an important part of the invention to maintain the hydrogen chloride concentration in the electrolyte at a high level, preferably within the range noted hereinabove.

The chlorine gas leaving the cell is collected in pipe or header 24 and fed to a chlorine cooler 25 through pipe 26. The cooled chlorine gas is fed through pipe 27 to the chlorine drier 28, the gas being removed therefrom through a suitable pump 29 to the outlet pipe 30. Concentrated $H_2SO_4$ may be fed through pipe 31 to the drier for the purpose of drying the wet chlorine gas. As will be explained hereafter, a flow control arrangement 32 responsive to the flow at 32A of the chlorine from the system can be used to control the addition of HCl to the system by regulating valve 33.

The cell effluent or liquor can flow from the cells through pipe 34 to the sump 35, said sump having a pump 36 for pumping the liquor through pipe 37 into the first oxidation tank 38. A flow control valve 39 can be furnished responsive to the level in the first oxidation tank to control the flow of liquor to the first tank.

The oxidation tanks should have suitable agitator impellers therein and air is blown therethrough from a blower 80, said blower feeding air to header 40 which is connected to each of the oxidation tanks. Five oxidation tanks or zones are shown but it is understood that a greater or less number of tanks may be employed. The flow of air can be controlled by a suitable by-pass 81. The oxidation tanks can be of the described and preferred agitated tank type having suitable agitating impellers or similar arrangements therein, although other types of devices can be used such as packed towers or diffusers.

It can be theorized that in the oxidation of a material such as cuprous chloride to cupric chloride in an HCl solution with oxygen from the air, several processes take place. First, the oxygen in the air diffuses through the gas film to the liquid surface and there it dissolves and then diffuses through the liquid film into the cuprous solution.

The oxidation tank spent or vent gases containing water vapor and HCl are removed through pipes 41 to a common header 42. The partially reoxidized liquor effluent from tank 1 is fed by pipe 43 into the second oxidation tank and this is repeated in the various oxidation tanks until next to the last tank is reached, the flow between the tanks being arranged to take place by gravity if desired. The oxidation tank spent gas containing water vapor and HCl is collected and can be fed through an entrainment trap 44 into a vent gas drier arrangement 45.

As previously mentioned, the oxidation tank vent gas drier can be made so that advantage is taken of the exothermic reactions involved. Concentrated sulphuric acid is fed through pipe 48 into said drier by pump 47.

A barometric type evaporator and condenser arrangement 49 has a weak sulphuric acid effluent from the vent gas drier fed thereto through pipe 50 and heater 51. Heater 51 can be employed to furnish any additional heat if required. The evaporator 52 and condenser 55 operate under vacuum, which makes it possible to utilize the heat generated when water vapor is absorbed in the sulphuric acid in tower 45 to revaporize or flash off the water in evaporator 52. The vacuum is maintained by condensation of water vapor in condenser 55 by direct contact with cold water, and by removal through ejector 57 of any noncondensible gases that enter the system.

The effluent passing into barometric evaporator 52 has the water flash into vapor therein, said vapor being carried through entrainment trap passage 54 to water condenser 55. The reconcentrated $H_2SO_4$ is collected in barometric leg 53 and returned to vent gas drier 45. The vapor carried in pipe 54 to the condenser element 55 is condensed in barometric leg 56; a suitable air ejector arrangement for condenser 55 being indicated at 57. By proper insulation, the operation of the sulphuric acid vent gas drier arrangement can be made substantially adiabatic, any small amount of heat required to be added being furnished by heater 51.

The partially or fully dried vent gases then can be passed through an entrainment separator 58 to a packed column arrangement or HCl absorber 59 through pipe 60. A portion of the partially reoxidized liquor is removed from the system at 61 by pump 62 and fed through pipe 63 into the absorber 59, cooler 64 being provided. Cooler 64 is necessary inasmuch as the HCl could not be reabsorbed in a hot solution. The absorbing solution must be at a lower temperature than the liquor in the oxidation tanks. A flow control valve 82 responsive to the liquor return temperature can be provided to control the amount of the liquor stream fed to the HCl absorber column 59. Most of the HCl and remaining water is removed from the vent gases in the HCl absorber 59 and returned through pipe 65 to the last oxidation tower where it rejoins the remainder of the partially oxidized liquor stream fed thereto by pipe 66 from next to the last oxidation tank. A portion or all of the liquor stream can be diverted from the system at some other suitable point other than between the next to last and last oxidation tank, but it is preferred to be accomplished in the manner described.

It is, of course, possible to recover the HCl and remove water in other manners.

Another manner in which the $H_2SO_4$ from the vent gas drier could be recovered would be by reconcentrating the same with combustion gases such as in a packed tower by means of heat, but such an arrangement would have large fuel requirements.

The HCl to be fed to the system to properly maintain concentrations, preferably is introduced into the system in the last oxidation tank. In one embodiment, relatively strong hydrochloric acid is fed by a pump 67 through a feed preheater or heat exchanger 68 into a packed distillation column 69 or HCl expeller apparatus. The hydrochloric acid passes through the column into a reboiler 83 so that it progressively decreases in HCl content to approximately that of constant boiling acid. From column 69, the hydrochloric acid flows through feed preheater or heat exchanger 68 and cooler 70 back to the process producing the by-product HCl, where it is enriched with HCl gas to produce relatively strong hydrochloric acid for feeding to the HCl expeller apparatus. The HCl rich vapors pass from the top of the column 69 into a partial condenser 71, condensate therefrom being returned as reflux through line 72 into the packed distillation column. The HCl gas is carried through line 73 and blown into the last oxidation tank 74 as described. The reoxidation liquor is then carried through line 75, cooler 76, back to feed tank 23. A continuous CuCl and $CuCl_2$ analyzer can be provided at 77 if desired for the purpose of controlling the operation of the system, either manually or through suitable control mechanism connected therewith.

As a specific example of one manner in which the described system can be operated in conjunction with the recovery of chlorine from waste hydrochloric acid, a system may be described in which approximately 223,000 lbs. by weight per hour of liquor is fed to the first oxidizer. For example, this liquor may contain by weight, approximately 3.4% CuCl; 10.2% $CuCl_2$, 20.4% HCl, and 66% $H_2O$.

A system for producing 35 tons per day of chlorine with a 34% hydrochloric acid feed, could use 5 agitated oxidation tanks with impellers as described. A total of 750 cubic feet per minute of free air at 4 lbs. per square inch being blown into the oxidation tanks, this being divided so that tanks #1 and #2 each receive about 266 cubic feet per minute; tank #3, 135 cubic feet per minute; tank #4, 56 cubic feet per minute, and tank #5, 27 cubic feet per minute. In such an instance, the oxidation tanks can be operated so that the oxygen efficiencies of tanks Nos. 1 to 5, would be about 81%, 81%, 79%, 79% and 44%, respectively. The efficiency values for the different stages vary because oxygen absorption rate controls during the first three stages and reaction rates during the last two stages.

Merely by way of example, the oxidation tanks can be made 12 feet deep, 8 feet inside diameter, and each can be equipped with an agitator, baffles, and an air sparger. The maximum air rate which can be used efficiently with such a tank, is about 6.7 feet per minute velocity based on the tank cross-section area, this rate being used in the first two stages. The power input to each of the first three tanks would be about 40 horsepower, and for the last two tanks, 20 horsepower each. The temperature in the first tank may be about 83° C. and the temperature in the last tank 94° C. The temperature of the dried vent gas being fed to the vent gas reabsorber column 59 may be about 115° C., and the temperature of the liquor effluent being returned to No. 5 oxidation tank may be about 70° C. The temperature of the liquor stream into the HCl absorber column 59 may be about 40° C., cooler 64 lowering the temperature to the desired value.

In one manner of operating the process, approximately 10% by weight of the liquor stream can be removed or diverted from the main solution stream following oxidation tank No. 4. This diverted portion after cooling to about 40° C. is used to recover or reabsorb the HCl in the oxidation tank vent gases. It is, of course, to be understood that the proportion removed from the main liquor stream for HCl reabsorption purposes will depend upon the specific operation of the system.

In the example, the portion of the liquor used to reabsorb HCl from the vent gas can be taken from between oxidation tank #4 and #5 and returned to #5. The liquor used for this purpose should have a relatively low HCl concentration, and this condition is adequately met by the liquor in No. 4 oxidizer, since HCl has been consumed in the oxidation in this and the preceding oxidizers. The makeup HCl is added in No. 5 oxidizer, and hence the HCl concentration is relatively high in this unit. Return of the liquor to any oxidizer other than No. 5 would tend to reduce the concentration of cuprous chloride in these units and this would reduce the rate of oxidation.

The oxidation tower vent gases in the described operation may contain about 11.9% of the water to be removed from the process and 22% of the HCl fed into the system. Vent gas drying tower 45 may be operated so that 93% of the water to be removed from the process is absorbed by the sulphuric acid.

The temperature of the cooling water in the barometric condenser should not rise above about 33° C. and a vacuum of about 28 inches Hg should be maintained therein. About 7% of the water to be removed from the system and about 0.7% of the HCl fed to the system may be lost through the waste vent gas outlet 84 from the HCl absorber 59. The rate of flow of liquor to the absorber 59 may be controlled by the temperature of the liquor coming out of said absorber 59. The temperature of the liquor into the absorber 59 may be used to control the water flow to cooler 64.

When hydrochloric acid is involved in a chlorine recovery process, the distillation column or HCl expeller 69 may be operated so that when the inflow has a 34% HCl concentration, the concentration of the return to the HCl storage tank will be reduced to about 21% HCl. In the operation of the electrolytic cells, the voltage may be 1.75 volts per cell and the current efficiency 81%, the current density being approximately 400 amperes per square foot of cathode surface.

If desired, small coolers may be used between some or all of the oxidizers instead of the illustrated large cooler 76.

In the specific example described, with a total weight of liquor entering No. 1 oxidizer of about 223,000 lbs. per hour, 3100 lbs. per hour of 98% HCl can be fed to No. 5 oxidation tank and about 2900 lbs. per hour of $Cl_2$ withdrawn from the process. In such a process, approximately 2200 lbs. of liquor are fed to the vent gas reabsorber tower 59. About 41,500 lbs. per hour of 76% $H_2SO_4$ is required in the vent gas drier, the sulphuric acid being fed at about 115° C. into said drier and being raised to 144° C. in the drier or by an addition of heat as it passes through heater 51 before it is introduced into the barometric evaporator 52.

It is to be understood that various types of apparatus may be used which will affect the quantities and temperatures involved and that the above is merely one example of the manner in which the oxidation process described herein may be employed.

The oxidation portion of this invention may be used in other processes.

The process and apparatus may have details thereof varied without departing from the spirit of the invention except as defined in the appended claims.

What is claimed is:

1. In a process for recovery of chlorine values from hydrogen chloride present in the used electrolytic solution of a chlorine cell operating on an aqueous electrolyte containing hydrogen chloride and the chloride of a metal capable of existing in differing ionic valence states, said metal being at least in part reduced during electrolysis from a higher to a lower valence state, the improvement comprising: transferring said cell solution to an oxidizing zone; intimately contacting the cell solution in said oxidizing zone with gas containing elemental oxygen for a time sufficient to substantially effect (1) oxidation of hydrogen chloride with simultaneous formation of water and conversion of metal from a lower to a higher valence state, and (2) volatilization of water from the cell solution; dewatering hydrogen chloride-containing vent gases discharged from the oxidizing zone; withdrawing oxidized cell solution from the oxidizing zone; cooling the withdrawn cell solution to a temperature substantially below that obtaining in the oxidizing zone; contacting said vent gases with cooled oxidized solution; introducing additional hydrogen chloride into the oxidized cell solution in an amount approximately equal to the amount oxidized in the oxidizing zone; and finally returning the reconstituted cell solution to the chlorine cell.

2. The process of claim 1 wherein only a portion of the oxidized cell solution is withdrawn from the oxidizing zone; cooled; contacted with the dewatered vent gases; and then reunited with the remainder of the oxidized cell solution discharged from the oxidizing zone.

FRANK S. LOW.
CHARLES P. ROBERTS.

References Cited in the file of this patent

UNITED STATES PATENTS

| Number | Name | Date |
|---|---|---|
| 741,637 | Dow | Oct. 20, 1903 |
| 850,695 | Vermeesch | Apr. 16, 1907 |
| 1,198,519 | Bradley | Sept. 19, 1916 |
| 1,207,243 | Vadner | Dec. 5, 1916 |
| 1,553,223 | Dietzsch | Sept. 8, 1925 |
| 1,917,226 | Bacon et al. | July 11, 1933 |
| 2,312,952 | Balcar | Mar. 2, 1943 |
| 2,468,766 | Low | May 3, 1949 |